United States Patent
Parthasarathy et al.

(10) Patent No.: US 11,403,327 B2
(45) Date of Patent: Aug. 2, 2022

(54) MIXED INITIATIVE FEATURE ENGINEERING

(71) Applicant: International Business Machines Corporation, Armonk, NY (US)

(72) Inventors: Srinivasan Parthasarathy, White Plains, NY (US); Tejaswini Pedapati, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/280,528

(22) Filed: Feb. 20, 2019

(65) Prior Publication Data

US 2020/0265071 A1   Aug. 20, 2020

(51) Int. Cl.
  *G06F 16/28* (2019.01)
  *G06F 9/50* (2006.01)
  *G06N 20/00* (2019.01)
  *G06F 16/25* (2019.01)

(52) U.S. Cl.
  CPC ............ *G06F 16/287* (2019.01); *G06F 9/505* (2013.01); *G06F 16/254* (2019.01); *G06N 20/00* (2019.01)

(58) Field of Classification Search
  None
  See application file for complete search history.

(56) References Cited

U.S. PATENT DOCUMENTS

| | | | | |
|---|---|---|---|---|
| 6,466,980 B1 * | 10/2002 | Lumelsky | ........... | H04L 43/0882 709/224 |
| 7,272,593 B1 * | 9/2007 | Castelli | ............... | G06F 16/3347 707/999.005 |
| 7,564,143 B1 * | 7/2009 | Weber | ................... | F03B 13/264 60/398 |
| 7,788,064 B1 | 8/2010 | Hao et al. | | |
| 8,510,288 B2 | 8/2013 | Mital et al. | | |
| 8,725,456 B1 * | 5/2014 | Saha | .................. | G05B 23/0283 702/182 |

(Continued)

OTHER PUBLICATIONS

Parameswaran, et al. (2013). Seedb: Visualizing database queries efficiently. Proceedings of the VLDB Endowment, 7(4), pp. 325-328.

(Continued)

*Primary Examiner* — Stella Higgs
(74) *Attorney, Agent, or Firm* — Daniel Morris; Otterstedt, Wallace & Kammer, LLP

(57) ABSTRACT

Computerized interactive feature visualization is carried out on a data set—a plurality of insight classes rank a plurality of features of the data set. Via a computerized user interface, user feedback is obtained based on the interactive feature visualization—a user selects and ranks a subset of the features. At least one transformation function is applied to at least one feature of the subset of features selected by the user, to automatically construct, with a computer, at least one additional feature for the data set. The data set with the at least one additional feature is a transformed data set. In some cases, a supervised task is carried out on the final data set; accuracy of a machine learning system implementing the at least one supervised task can be enhanced by the at least one additional feature, and/or a physical system can be controlled based on results of the at least one supervised task.

14 Claims, 9 Drawing Sheets

(56) References Cited

U.S. PATENT DOCUMENTS

| | | | | |
|---|---|---|---|---|
| 8,762,298 B1* | 6/2014 | Ranjan | | G06F 21/552 |
| | | | | 706/12 |
| 9,292,625 B2 | 3/2016 | Tyagi et al. | | |
| 9,934,299 B2 | 4/2018 | Prabhu et al. | | |
| 10,026,040 B2 | 7/2018 | Sanchez et al. | | |
| 10,095,665 B2 | 10/2018 | Cardno | | |
| 10,439,884 B1* | 10/2019 | Forte | | H04L 63/1425 |
| 11,048,718 B2* | 6/2021 | Khalil | | G06N 3/0454 |
| 2002/0159641 A1* | 10/2002 | Whitney | | G06K 9/6228 |
| | | | | 382/219 |
| 2004/0083452 A1* | 4/2004 | Minor | | G16B 50/20 |
| | | | | 717/109 |
| 2004/0267740 A1* | 12/2004 | Liu | | G06F 16/5838 |
| 2005/0216254 A1* | 9/2005 | Gupta | | G06V 10/96 |
| | | | | 345/157 |
| 2006/0133666 A1* | 6/2006 | Liu | | G06K 9/6228 |
| | | | | 382/190 |
| 2008/0133434 A1* | 6/2008 | Asar | | G06N 20/10 |
| | | | | 706/12 |
| 2008/0233576 A1* | 9/2008 | Weston | | G06N 20/10 |
| | | | | 707/999.005 |
| 2008/0281764 A1* | 11/2008 | Baxter | | G06K 9/629 |
| | | | | 706/12 |
| 2009/0187555 A1* | 7/2009 | Liu | | G06F 16/334 |
| | | | | 707/999.005 |
| 2011/0213784 A1* | 9/2011 | Udupa | | G06F 16/3347 |
| | | | | 707/E17.051 |
| 2011/0302118 A1* | 12/2011 | Melvin | | G06N 20/00 |
| | | | | 707/802 |
| 2014/0200723 A1* | 7/2014 | Roy | | H02J 3/32 |
| | | | | 700/291 |
| 2014/0222998 A1* | 8/2014 | Vasseur | | H04L 43/10 |
| | | | | 709/224 |
| 2014/0279747 A1* | 9/2014 | Strassner | | H04L 41/085 |
| | | | | 706/12 |
| 2016/0055426 A1* | 2/2016 | Aminzadeh | | G06N 20/00 |
| | | | | 706/12 |
| 2016/0071017 A1* | 3/2016 | Adjaoute | | G06N 20/00 |
| | | | | 706/52 |
| 2016/0125501 A1* | 5/2016 | Nemery | | G06N 20/00 |
| | | | | 705/26.7 |
| 2016/0267397 A1* | 9/2016 | Carlsson | | G06N 5/025 |
| 2016/0299899 A1* | 10/2016 | Logachev | | G06F 16/951 |
| 2016/0364655 A1 | 12/2016 | Muhammad et al. | | |
| 2016/0371489 A1* | 12/2016 | Puri | | G06F 16/254 |
| 2017/0103338 A1* | 4/2017 | Zhang | | G06F 40/30 |
| 2017/0193066 A1* | 7/2017 | Zhu | | G06F 16/254 |
| 2017/0316319 A1 | 11/2017 | Livingston et al. | | |
| 2018/0018538 A1* | 1/2018 | Ishii | | G06V 10/75 |
| 2018/0137219 A1* | 5/2018 | Goldfarb | | G06N 3/126 |
| 2018/0150746 A1* | 5/2018 | Tu | | G06N 3/088 |
| 2018/0173372 A1* | 6/2018 | Greenspan | | G06T 11/206 |
| 2018/0218431 A1* | 8/2018 | Prendki | | G06Q 30/0631 |
| 2018/0232659 A1* | 8/2018 | Ranatunga | | G06Q 30/0241 |
| 2018/0285787 A1* | 10/2018 | Ito | | G06Q 10/04 |
| 2018/0300333 A1* | 10/2018 | Wang | | G06N 20/00 |
| 2019/0164087 A1* | 5/2019 | Ghibril | | G06N 5/02 |
| 2019/0180358 A1* | 6/2019 | Nandan | | G06K 9/6219 |
| 2019/0303727 A1* | 10/2019 | Foroughi | | G06N 5/003 |
| 2020/0074246 A1* | 3/2020 | Goyal | | G06K 9/6224 |
| 2020/0090003 A1* | 3/2020 | Marques | | G06F 17/18 |
| 2020/0104401 A1* | 4/2020 | Burnett | | G06F 16/287 |
| 2020/0175314 A1* | 6/2020 | Fang | | G06K 9/623 |
| 2020/0202268 A1* | 6/2020 | Retna | | G06Q 30/016 |
| 2020/0202560 A1* | 6/2020 | Viswanathan | | G06K 9/6232 |
| 2020/0226168 A1* | 7/2020 | Chen | | G06F 16/972 |
| 2020/0242111 A1* | 7/2020 | Oberbreckling | | G06F 16/248 |
| 2020/0250556 A1* | 8/2020 | Nourian | | G06Q 10/0635 |
| 2020/0250562 A1* | 8/2020 | Bly | | G06F 16/24578 |
| 2020/0367074 A1* | 11/2020 | Zhang | | G06F 9/542 |
| 2021/0073599 A1* | 3/2021 | Dai | | G06N 7/005 |
| 2021/0303675 A1* | 9/2021 | Petersen | | G06F 21/554 |

OTHER PUBLICATIONS

Shao, et al. (2014) Guided sketching for visual search and exploration in large scatter plot spaces. Proc EuroVA International Workshop on Visual Analytics, vol. 2. (pp. 1-5).

Demiralp ç, Haas PJ, Parthasarathy S, Pedapati T. Foresight: Recommending visual insights. Proceedings of the VLDB Endowment. Aug. 1, 2017;10(12):1937-40.

Peter Mell and Timothy Grance, The NIST Definition of Cloud Computing, Special Publication 800-145, Sep. 2011, cover, pp. i-iii, 1-3.

* cited by examiner

FIG. 7

| | T 2017 | S 2017 | AVG 2017 | T 2018 | S 2018 | AVG 2018 | T 2019 | S 2019 | AVG 2019 | S/T 2017 | S/T 2018 | S/T 2019 |
|---|---|---|---|---|---|---|---|---|---|---|---|---|
| SCH. A | 10 | 200 | 85 | 10 | 205 | 83 | 9 | 195 | ? | 20.0 | 20.5 | 21.7 |
| SCH. B | 5 | 95 | 87 | 6 | 90 | 89 | 4 | 80 | ? | 19.0 | 15.0 | 20.0 |
| SCH. C | 7 | 70 | 91 | 6 | 71 | 89 | 10 | 75 | ? | 10.0 | 11.8 | 7.5 |

FIG. 8

| FUNCTION | TYPE |
|---|---|
| SIN | REAL |
| COS | REAL |
| TAN | REAL |
| extract_day | TIMESTAMP |
| zipcode-extractor | MAILING ADDRESS |

FIG. 9

| FEATURE | TYPE |
|---|---|
| STUDENT NAME | STRING |
| STANDARDIZED TEST SCORE | REAL NUMBER |
| SCHOOL NAME | STRING |
| SCHOOL DISTRICT | ENUMERATED DATA TYPE |
| AGE | INTEGER |
| STUDENT-TEACHER RATIO | REAL NUMBER |

MIXED INITIATIVE FEATURE ENGINEERING

TECHNICAL FIELD

The present invention relates to the electrical, electronic, and computer arts, and more specifically, to exploratory data analysis (EDA), machine learning, data science workflows, and the like.

BACKGROUND

Several tasks in data analysis and machine learning involve creating new features from existing features ("feature engineering"). Non-limiting examples include feature engineering in supervised tasks such as classification and regression; feature engineering in unsupervised tasks such as clustering and outlier analysis; and data imputation when there are missing data items. Heretofore, feature engineering has been as much an art as a science and can often be quite effort-intensive.

SUMMARY

Embodiments of the present invention provide techniques for mixed initiative feature engineering. According to one aspect, an exemplary method includes carrying out computerized interactive feature visualization on a data set, wherein a plurality of insight classes rank a plurality of features of the data set; via a computerized user interface, obtaining user feedback based on the interactive feature visualization, wherein a user selects and ranks a subset of the features; and applying at least one transformation function to at least one feature of the subset of features selected by the user, to automatically construct, with a computer, at least one additional feature for the data set, the data set with the at least one additional feature including a transformed data set.

In another aspect, an exemplary apparatus includes a memory; and at least one processor, coupled to the memory, and operative to: carry out computerized interactive feature visualization on a data set, wherein a plurality of insight classes rank a plurality of features of the data set; implement a computerized user interface, which obtains user feedback based on the interactive feature visualization, wherein a user selects and ranks a subset of the features; and apply at least one transformation function to at least one feature of the subset of features selected by the user, to automatically construct at least one additional feature for the data set, the data set with the at least one additional feature including a transformed data set. The apparatus optionally includes a network interface coupled to the memory and the at least one processor, which controls a physical system in accordance with the transformed data set.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

accelerating the technological process(es) of data preparation/cleaning/feature engineering which are pertinent aspects in machine learning and data exploration;

enabling automatic construction of new features that enhance data; and/or selecting from an existing set of features.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 shows construction of new features from existing features for tabular data, in accordance with an aspect of the invention;

FIG. 8 is an exemplary data structure showing functions and corresponding types, in accordance with an aspect of the invention;

FIG. 9 is an exemplary data structure showing features and corresponding types, which together with the data structure of FIG. 8 cooperatively implements a mapping data structure for feature construction, in accordance with an aspect of the invention.

DETAILED DESCRIPTION

Figure 1:
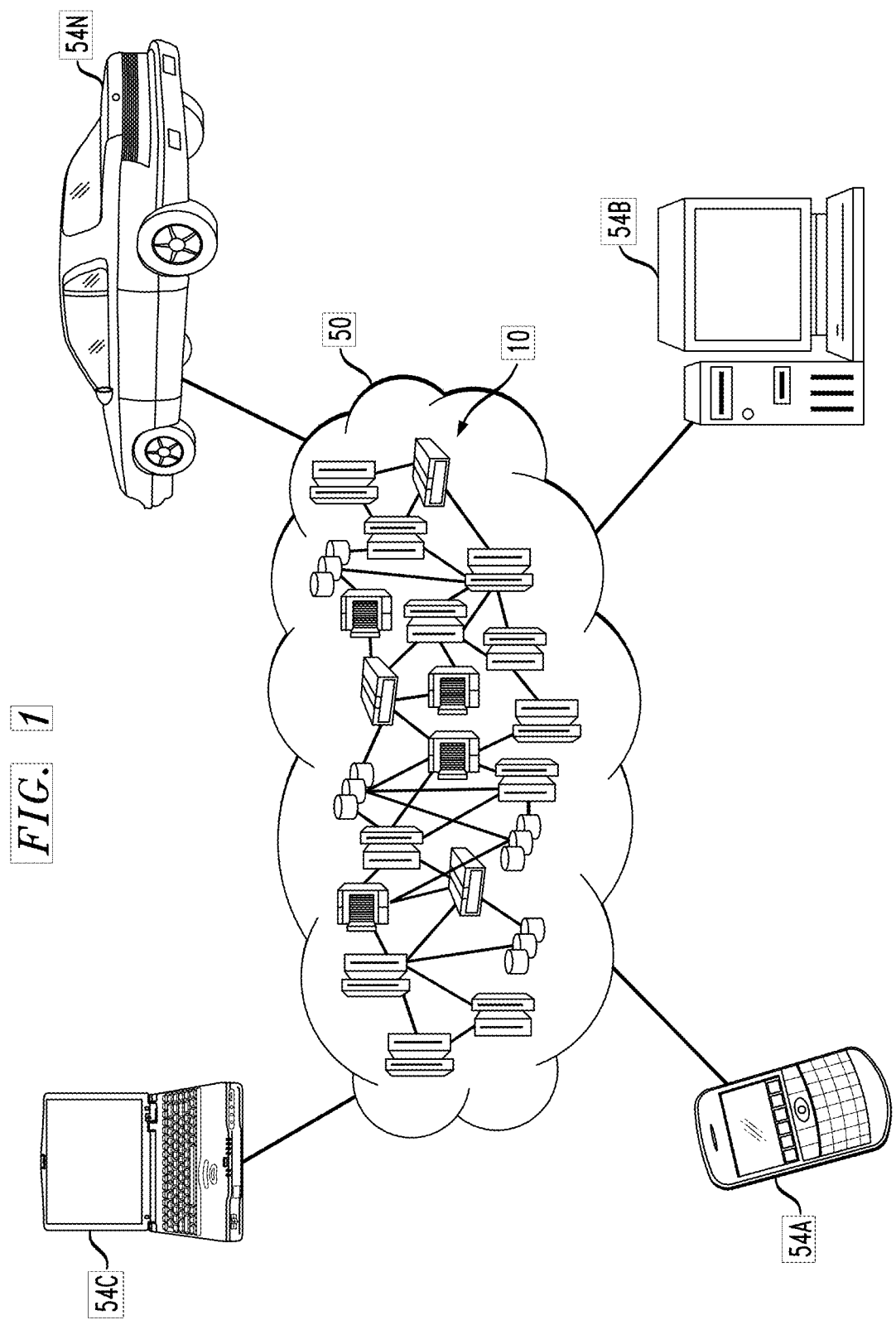
FIG. 1 depicts a cloud computing environment according to an embodiment of the present invention.

Several tasks in data analysis and machine learning involve creating new features (features include, for example, columns in tabular data; attributes in JSON (JavaScript Object Notation) data; and so on) from existing features.

These include feature engineering in supervised tasks such as classification and regression; feature engineering in unsupervised tasks such as clustering and outlier analysis; and data imputation when there are missing data items. Heretofore, feature engineering has been as much an art as a science. Furthermore, feature engineering can be effort intensive. One or more embodiments advantageously expedite the process of feature engineering for these tasks through a mixed initiative visual approach.

One or more embodiments relate to automated feature engineering in machine learning and data analysis tasks. Indeed, one or more embodiments employ a visual exploratory analysis technique to rank and present features in the data; elicit user feedback about the most interesting features; and/or employ this feedback to automatically construct new features that enhance the data. One or more instances accelerate the process of data preparation/cleaning/feature engineering which are pertinent steps in machine learning and exploration tasks; for example, in applications such as the IBM Watson Data Science Experience (DSX) which provides advanced analytics capabilities for data scientists (e.g., write code for machine learning/deep learning).

One or more embodiments can be implemented in both cloud-computing and non-cloud computing environments. In a cloud computing environment, aspects of the invention could be offered as a cloud-based service, and/or aspects of the invention could be used in connection with computing demand prediction and control/provisioning/deprovisioning of cloud computing resources.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
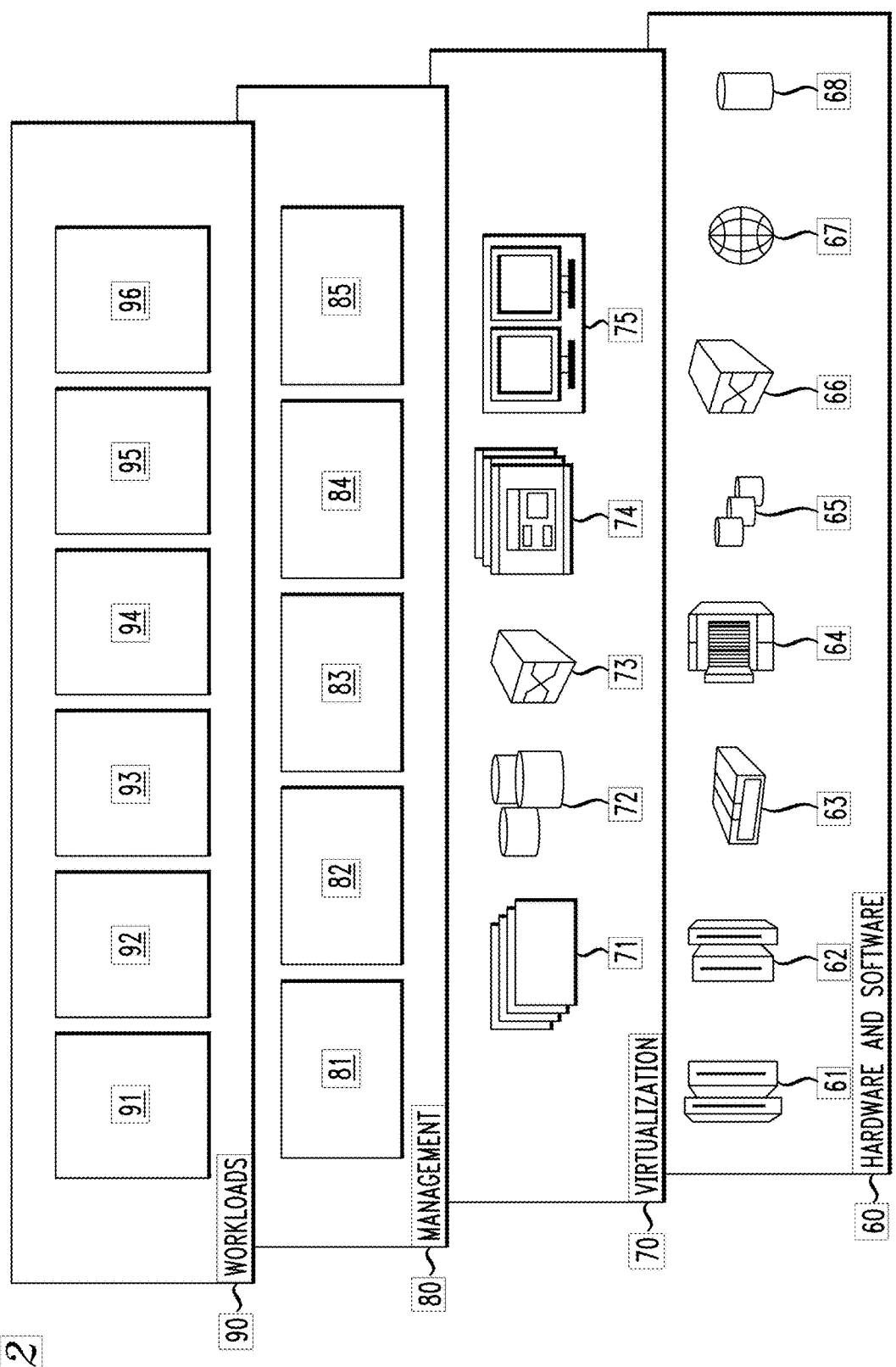
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service for mixed-initiative feature engineering 96. As noted, in a cloud computing environment, aspects of the invention could be offered as a cloud-based service 96, and/or aspects of the invention could be used in connection with computing demand prediction and control/provisioning/deprovisioning of cloud computing resources (e.g. within management layer 80).

Figure 3:
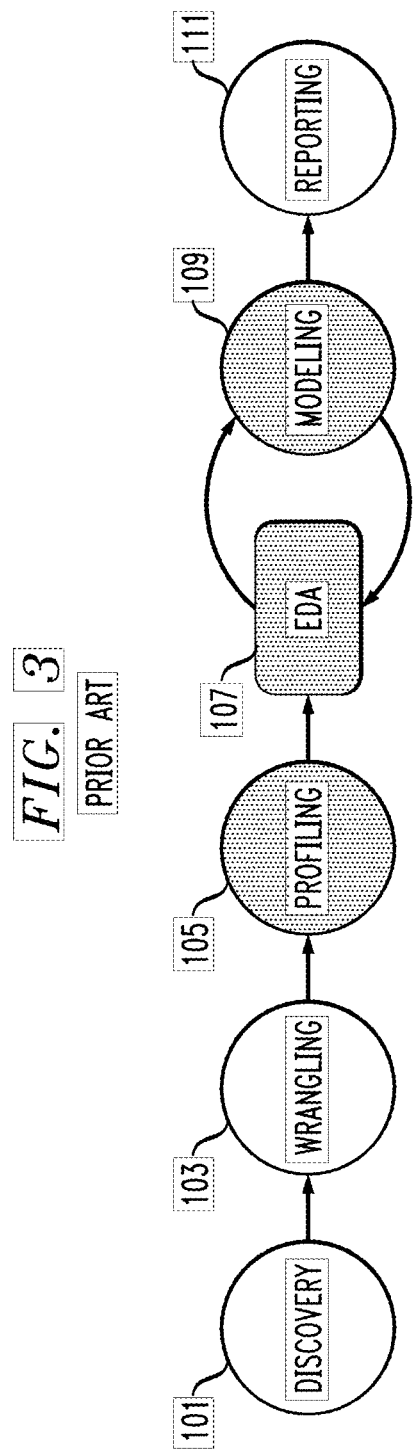
FIG. 3 depicts exploratory data analysis (EDA) within the data analysis process, according to the prior art.

Attention should now be given to FIG. 3, which shows EDA within the context of a larger data analysis process. In step 101, discover the data. In step 103, wrangle the data; i.e., transform and/or map the data from a raw state into another format to make it more appropriate and valuable for a variety of downstream purposes such as analytics. In step 105, profile the data to determine its accuracy and/or completeness. In steps 107 and 109, iteratively carry out EDA and modeling. In step 111, report the results.

Figure 4:
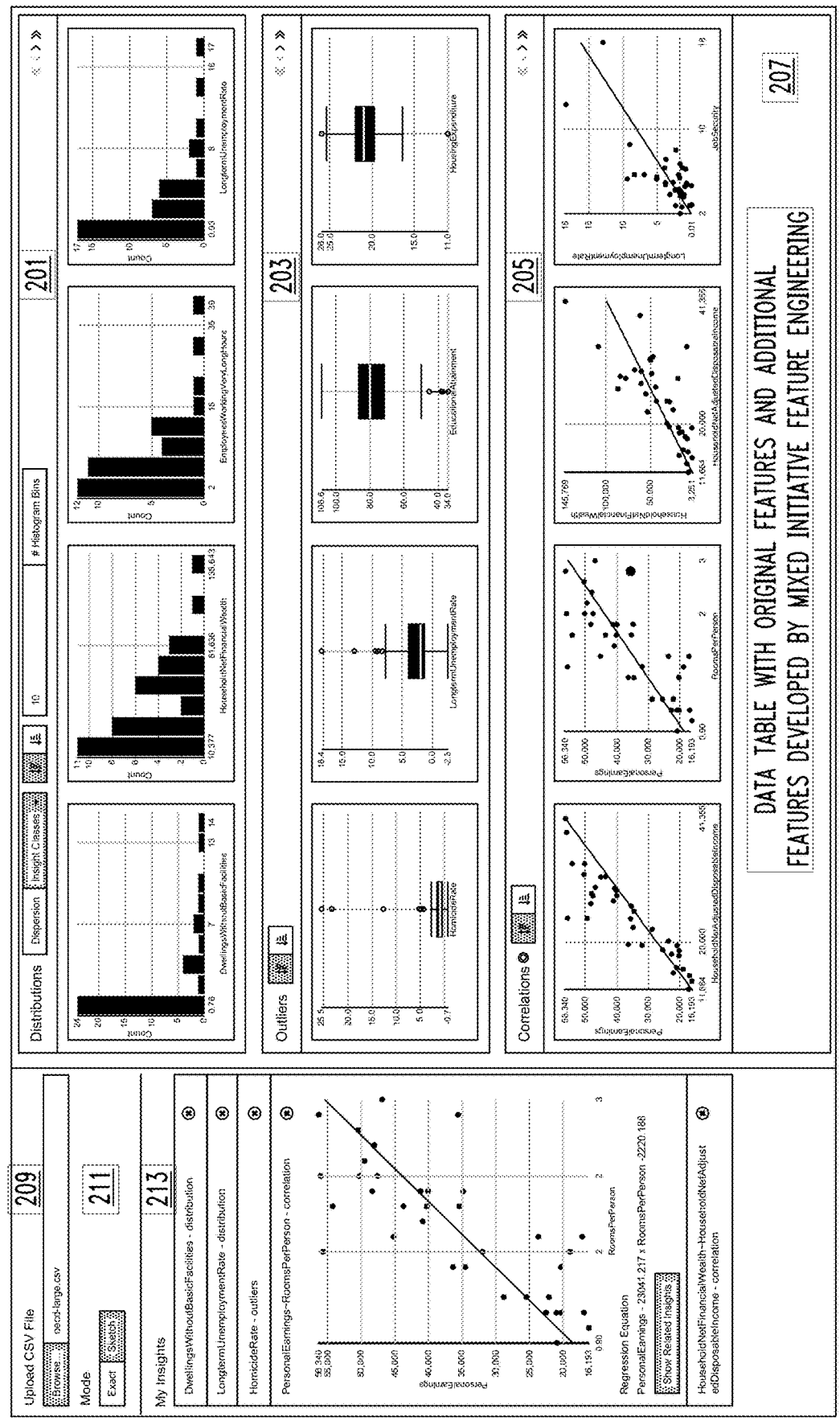
FIG. 4 depicts a user interface showing exemplary data visualization insights, wherein tabular data includes original features and additional features developed by mixed initiative feature engineering, according to an aspect of the invention.

The publication by Çağatay Demiralp et al., "Foresight: Recommending visual insights," Proceedings of the VLDB Endowment, 2017 Aug. 1; 10(12):1937-40 (hereinafter, "Demiralp et al."), discloses a system that enables users to rapidly discover visual insights from large high-dimensional datasets by providing interactive feature visualization with ranking of features based on insight classes. Demiralp et al. is hereby expressly incorporated by reference herein in its entirety for all purposes. Each carousel in the Foresight user interface (UI), as described in Demiralp et al., corresponds to a distinct class of insight and presents visualizations potentially filtered according to user specific criteria belonging to this insight class and prioritized according to a ranking metric selected by the user. Visualizations within a carousel are ranked by the insight's ranking metric with the strongest insights displayed first. FIG. 4 shows some examples of interactive feature visualization provided by a system such as that of Demiralp et al., modified such that tabular data includes both original features and additional features developed by mixed initiative feature engineering, according to an aspect of the invention. Users are enabled to rapidly discover visual insights from large high-dimensional datasets by providing interactive feature visualization with ranking of features based on insight classes. FIG. 4 shows three insight classes (out of six supported by the Demiralp et al. system): low dispersion 201, outliers 203, and linear correlations 205. Users can also explore "related" insights as seen at 213. As seen at 211, "exact" and "sketch" modes are provided. The Demiralp et al. system enables fast response times for exploration of large high-dimensional data through approximate but provably good sketching techniques. Data can be input for analysis by, for example, uploading a comma separated value (CSV) file, as seen at 209. Data table 207 is generally representative of tabular data with original and derived features; a non-limiting detailed example is shown in FIG. 7.

Figure 5:
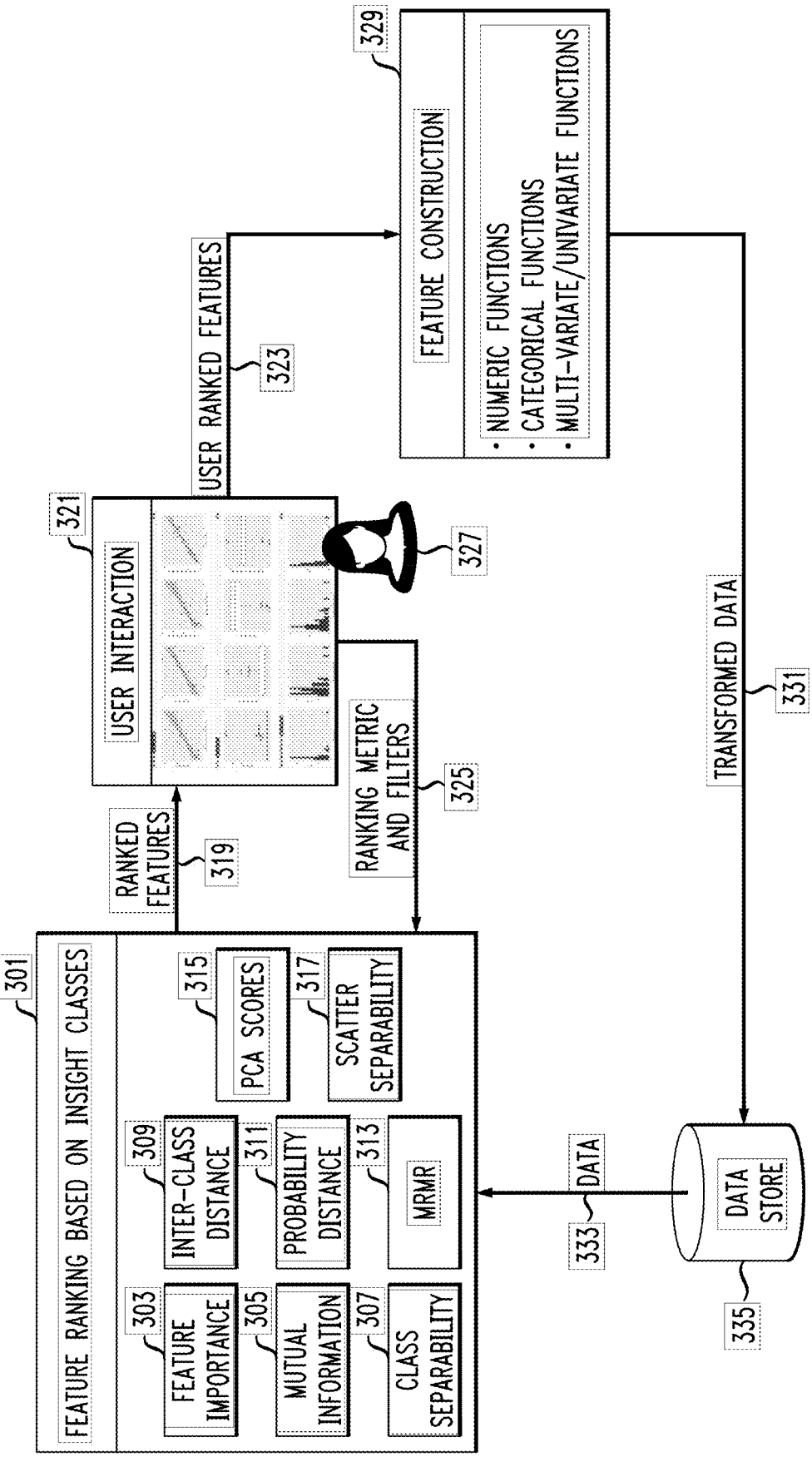
FIG. 5 is a block diagram of an exemplary system, in accordance with an aspect of the invention.
Figure 6:
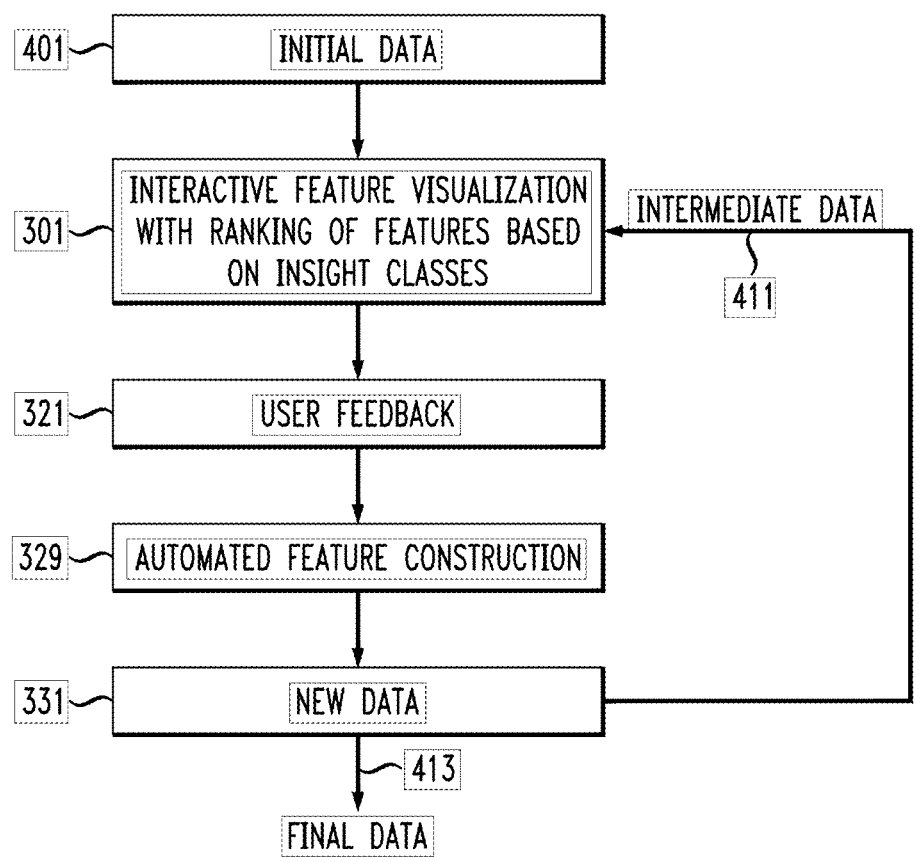
FIG. 6 depicts a flow chart of an exemplary method, in accordance with an aspect of the invention.

Refer now to FIGS. 5 and 6, which depict pertinent components and data flows of an automatic feature engineering system, according to an aspect of the invention. Initial data 401 is provided to a system 301 that enables users to rapidly discover visual insights from large high-dimensional datasets by providing interactive feature visualization with ranking of features based on insight classes. Refer, for example, to Demiralp et al. Note that data 333 in FIG. 5 is generally representative of the initial data 401 and intermediate data 411 in FIG. 6 as discussed below. User feedback on the ranked features 319 is then obtained at 321. The user feedback from user 327 can be, for example, in the form of a subset of derived or original features which are identified by the user as being of interest. In one or more embodiments, the system enables ranking of features but the user ultimately decides and selects. The feedback from the user 323 is then provided to automated feature generation/construction block 329. This results in "transformed" or "new" data 331 wherein new features have been created from the existing features. If further refinement is appropriate, the new data 331 constitutes intermediate data 411, which is provided to the system 301; user feedback is again obtained at 321; automated feature construction again takes place at 329, and further updated transformed/new data is obtained at 331. This continues until further refinement is no longer appropriate, at which point the final data 413 has been obtained. The stopping criteria for this process can be determined using a preset number of iterations, or when it is possible to construct a predictive model using the current set of features with the required level of accuracy, or using other such termination criteria, Initial, intermediate, and/or final data can be stored in data store 335.

System 301 can employ a number of different ranking metrics for features. Examples of metrics for supervised learning tasks include feature importance 303; mutual information 305; and class separability metrics 307 including error probability, inter-class distance 309, probabilistic distance 311, entropy, minimum Redundancy Maximum Relevance (mRMR) 313, and the like. Examples of metrics for unsupervised learning tasks include mutual information, scatter separability 317, Principal Component Analysis (PCA) scores 315, and the like. Examples of metrics for data imputation include statistical distances including f-divergences, Kullback-Leibler (KL) divergence, Hellinger distance, total variation distance, Renyi's divergence, and the like.

Regarding insight classes, in one or more embodiments, each class provides a way to rank features along with an appropriate visualization. An example in the context of data imputation includes ranking the new features according to KL divergence, and plotting a density estimate for new features with imputed values and existing features with missing values overlaid on top of each other.

In user feedback block 321, the user can select a subset of the features presented and also give them a score to result in user-ranked features 323.

Consider now automated feature construction block 329. One or more embodiments apply transformation functions to features selected by the user. These functions can be univariate or multivariate. In the case of multivariate functions, one or more features can come from the user's selection and other features can be existing features in the data. Non-limiting examples include sin, cos, count, extract_day, time_of_day, and the like. User-defined functions in databases are also possible.

Consider selecting and applying transformation functions. The choice of transformation functions to be applied can be determined, for example, based on the data as well as semantic types of the features selected by the user. For example, functions such as sine (sin) and cosine (cos) are applicable to numeric features, while functions such as "zipcode-extractor" are applicable to features which semantically correspond to physical addresses. The choice of transformation functions can also be determined by other analytics. How the transformation functions are to be applied on the data can be determined, for example, by where the data is stored and the processing mechanisms. For example, if the data is stored in a relational database, transformation functions can be applied using SQL queries.

One or more embodiments advantageously provide a mechanism for feature engineering which includes visual exploration of features 301 along with user feedback 321; automated construction of features at 329 based on user feedback and based on univariate or multivariate data transformation functions; and iterating over the preceding steps one or more times (see above discussion of "intermediate data" 411 and "final data" 413).

In one or more embodiments, visual exploration involves presentation of features/feature combinations in multiple carousels. In some cases, each carousel corresponds to a specific insight class where features/feature combinations are ranked according to the metric selected in the carousel and displayed according to the visualization scheme of the carousel. In some cases, the user can select one or more presented features/feature combinations and also give a score.

In one or more embodiments, automated feature construction involves applying univariate or multivariate data transformation functions using the selected features/feature combinations as arguments, where the functions can be, for example, transformation functions available in a database query language including user-defined functions.

Demiralp et al. addressed unsupervised exploration of data; one or more embodiments address creation of new features in the data. For example, it is desired to transform a data set and create new data. For tabular data, the data is arranged as a table with rows and columns; the columns are the features, and generation of more features implies more columns. Embodiments can also be applied to non-tabular data; e.g., JSON data, and/or can also be used on unstructured data.

In FIG. 5, the block 301 which carries out feature ranking based on insight classes includes carousels displaying features or different combinations of features. The features are displayed in an appropriate order of interest. Different feature ranking metrics can be used to carry out sorting. The statistical metrics (examples are given elsewhere herein) are computed for each of the features and a suitable sorting algorithm is used to rank the features according to these metrics. Non-limiting examples of sorting algorithms include Insertion sort, Selection sort, Merge sort, Heapsort, Quicksort, Shell sort, Bubble sort, Comb sort, Distribution sort, Counting sort, Bucket sort, Radix sort, and the like. The user interaction block 321 enables the user to try different feature ranking mechanisms, select features, and the like. It can be implemented with a suitable user interface, such as a graphical user interface (GUI) implemented, for example, by a server serving out html code to a browser of the user's computing device. The output is a subset of features selected by the user; it is provided to feature construction block 329.

Block 329 employs a mapping data structure which encodes which functions are applicable to which features. For example, suppose the user has selected a timestamp field. Functions such as extracting the day of the week, extracting the month of the year, extracting the hour of the day, are all functions that are applicable. However, functions such as computing the cosine or square of the time of day are not applicable. Referring now to FIGS. 8 and 9, in one or more embodiments, the data structure maps which functions (first column of FIG. 8) are applicable to which types (second column of FIG. 8 e.g., data types, semantic types, and so on). Indeed, in one or more instances, the data structure specifies the available functions and the types of arguments each function can accept, as well as the features and their associated types (first and second columns, respectively, of FIG. 9). Block 329 includes a feature construction algorithm which matches functions to features based on the types (e.g., functions in FIG. 8 mapped to features in FIG. 9 by matching on types). Examples of matching algorithms include simple keyword matching on types to more advanced type inferences which can support inherited types (e.g., integer type is also a real number type but not vice-versa). The type of the output is also known in one or more embodiments; i.e., what is the type of the value returned by the function—thus the data type of the new feature is also known. The function description will generally include the data type of inputs and the data type of outputs. Data type (e.g., integer, real number, string, and so on); or semantic type (timestamp, address, and so on) can also be used.

There are a number of reasons why it might be desired to create more features from a table. For example, referring to the table of FIG. 7, in the field of prediction/supervised learning, suppose the data includes average test scores over the past few years in a school. Suppose each row of the data is a school (e.g., School A, School B, School C abbreviated Sch. A, Sch. B, Sch. C) and the columns include some characteristic of the school (e.g. number of teachers T, number of students S), and the average test scores (AVG), for some period of time (e.g., 2017 and 2018), and it is desired to predict the test score for next year (2019). Existing features can be used to do the prediction; or, in some instances, it may be possible to combine some of the features in a non-trivial way to create a new feature. For example, suppose there are features including the number of students S and the number of teachers T for each year. One or more embodiments could create a student-to-teacher ratio (S/T) as a new feature to predict test scores. For example, it may be that schools with a lower ratio (fewer students for each teacher) perform better, or that a school which sees a sharp increase in STR may be expected to perform less well in the future, or that a school which sees a sharp decrease in STR may be expected to perform better in the future. In another example, perhaps the S/T is known for 2019 but the tests have not been administered yet, and it is desired to predict the test scores (suggested by the question marks under "AVG 2019"). The change or trend in S/T can be used as a predictive factor; looking at the absolute numbers of students or teachers might not yield insights.

Unlike manual techniques, one or more embodiments provide a mixed-initiative system wherein the user and the system cooperatively come up with new features; the approach is referred to as mixed initiative because the system provides automation to a certain extent.

As noted with regard to block 301, there are ways to visualize columns in the data. For example, it is possible to rank columns/rank existing features in the data according to different ranking criteria/metrics. According to one criterion, there may be certain top features ranked in a certain way, and so on. The user can select ranking(s)/top features/combinations of features—at the user's initiative. Based on the user's selection, the system can point out to the user some of the new features that the system can construct in the data. The Demiralp et al. system shows the features that are already present in the dataset, ranked according to certain criteria. One or more embodiments extend aspects of the Demiralp et al. system by showing what new features can be added to the dataset based on what the user selected. For example, the system may recommend applying a division transformation, dividing the number of students by the number of teachers to obtain a new feature, student-to-teacher ratio, S/T.

In some instances, the transformations applied to obtain new features are in the form of operators—for example, in the database there may be certain functions that are applied to the data (on one or more features/columns). This approach can be applied to many different types of databases—JSON, SQL, etc. The functions can be used to create new features. Once the user selects the features of interest at 321, the system comes up with suggestions for new features at 329. The user can select one or more of the proposed new features.

One or more embodiments have utility due, for example, to the ability of the system to make suggestions, both in terms of ranking existing features and suggesting new features. In one or more embodiments, from the recommendation, the user selects one or more possible additional features. The system then computes the new features, which then become part of the data.

This process can be repeated on top of the augmented data (with the new features) in order to suggest/compute still more additional features, as described above with regard to intermediate data 411 and final data 413. Iteration can continue in order to create a new table for prediction, regression, or whatever else the task is.

Ranking criteria can be pertinent in one or more embodiments. Different criteria can be employed. Ranking can be carried out, for example, according to statistical properties of the features. Features with a significant amount of variability may be ranked on top, or features with a significant amount of entropy, or features that are correlated highly with test scores can be ranked on top, for example. This aspect is, in essence, a more supervised ranking mechanism, where a target is employed and there is dependence between the feature and the target. There are different ways to carry out the ranking. In one or more embodiments, the system provides for all the different ways to do the ranking.

One or more embodiments thus solve a problem unique to computers and/or improve the functioning of a computer. For example, one or more embodiments improve a machine-learning system by enhancing the accuracy of a machine-learning model. By way of a non-limiting specific example, consider the machine learning problem of using regression to predict future demand (for example, for electricity, water, air traffic control, cloud computing resources, or the like). One or more embodiments improve the accuracy of such predictions by enhancing the data using exemplary techniques disclosed herein. The predictions can then be used as the basis for control of a physical system; for example, to bring additional electrical generating capacity online, to activate a connection to an aqueduct that runs to an additional water source, or to activate additional computing capacity for an air traffic control system (or in a general cloud environment as discussed below). Human resources (e.g. additional air traffic controllers) could also be summoned to work based on demand predictions. Furthermore, one or more embodiments render the technological process of machine learning more efficient by enabling automation of the feature augmentation process to replace time-consuming manual techniques. In another aspect, as noted, in a cloud computing environment, aspects of the invention could be offered as a cloud-based service 96, and/or aspects of the invention could be used in connection with computing demand prediction and control/provisioning/deprovisioning of cloud computing resources (e.g. within management layer 80).

Given the discussion thus far, it will be appreciated that, in general terms, an exemplary method, according to an aspect of the invention, includes, as seen at 301, carrying out computerized interactive feature visualization on a data set, wherein a plurality of insight classes rank a plurality of features of the data set. A further step, as seen at 321, includes, via a computerized user interface, obtaining user feedback based on the interactive feature visualization, wherein a user selects and ranks a subset of the features. An even further step, as seen at 329, includes applying at least one transformation function to at least one feature of the subset of features selected by the user, to automatically construct, with a computer, at least one additional feature for the data set. The data set with the at least one additional feature is a transformed data set.

One or more embodiments further include iteratively repeating the steps of carrying out interactive feature visualization, obtaining user feedback, and applying at least one transformation function, on the transformed data set, until a final data set is obtained. See, e.g., discussion of intermediate and final data 411, 413.

In some instances, the data set is tabular and the features include columns; in other instances, the data set is in JavaScript Object Notation (JSON) and the features include attributes. Other types of data sets can be sued in other embodiments.

Application of the at least one transformation function can include, for example, applying a univariate data transformation function with the selected features as arguments and/or applying a multivariate data transformation function with the selected features as arguments.

In some cases, a multivariate data transformation function is applied to arguments including at least one of the selected features and at least one existing one of the features. That is to say, as discussed elsewhere, in the case of multivariate functions, one or more features can come from the user's selection and other features can be existing features in the data.

One or more embodiments further include carrying out at least one supervised task on the final data set (e.g. classification, regression, and the like—specific non-limiting examples of supervised tasks include demand prediction coupled with inventory control; air traffic prediction coupled with capacity planning; electricity demand prediction coupled with generation capacity planning; water supply demand prediction coupled with water supply capacity planning; cloud computing resource demand prediction coupled with cloud computing resource capacity planning and so on).

Furthermore in this regard, in some instances, the at least one supervised task includes electricity demand prediction, and additional steps include at least one of: causing additional electrical generation capacity to be activated, based on the prediction indicating increased demand; and causing current electrical generation capacity to be reduced, based on the prediction indicating decreased demand. For example, send a control signal over a network interface such as network adapter 20 and/or an I/O interface 22, as discussed elsewhere herein.

In another aspect, in some instances, the at least one supervised task includes computer resources demand prediction, and additional steps include at least one of: causing additional computer resource capacity to be activated, based on the prediction indicating increased demand; and causing current computer resource capacity to be reduced, based on the prediction indicating decreased demand. Again, for example, send a control signal over a network interface such as network adapter 20 and/or an I/O interface 22, as discussed elsewhere herein.

In one or more embodiments, accuracy of a machine learning system implementing the at least one supervised task is enhanced by the at least one additional feature.

One or more embodiments further include carrying out at least one unsupervised task on the final data set (e.g. clustering, outlier analysis, or the like) and/or carrying out data imputation on the final data set (e.g. when there are missing data items).

In some instances, in the applying of the at least one transformation function, the at least one transformation function includes a user-defined function in a database query language.

One or more embodiments are directed to an apparatus, discussed immediately below with regard to FIG. 10, including a memory 28; optionally a network interface 20; and at least one processor 16, coupled to the memory and the network interface (if present), and operative to carry out or otherwise facilitate any one, some, or all of the method steps described herein. For example, various physical systems (electricity generation, water supply, cloud computing) can be controlled via the network interface (such as to activate/deactivate resources via switches, valves, and the like). For example, the at least one processor can be operative to carry out at least one supervised task on the final data set; the at least one supervised task can include demand prediction for a physical system. The at least one processor can be further operative to cause additional physical capacity of the physical system to be activated, based on the prediction indicating increased demand, by sending a first signal over the network interface, and/or cause current physical capacity of the physical system to be reduced, based on the prediction indicating decreased demand, by sending a second signal over the network interface.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention. Referring now to FIG. 10, in system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 10:
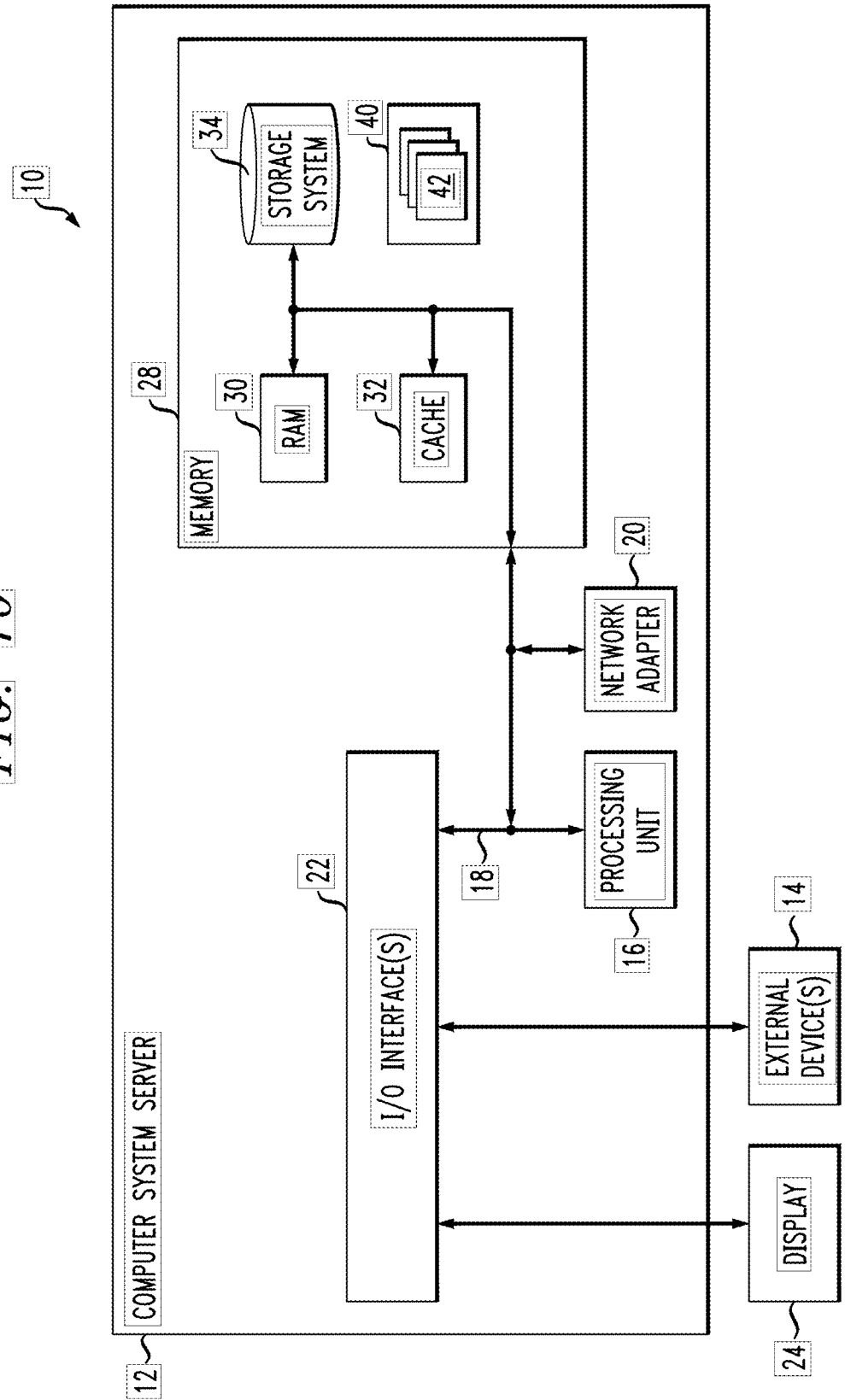
FIG. 10 depicts a computer system that may be useful in implementing one or more aspects and/or elements of the invention.

As shown in FIG. 10, computer system/server 12 in system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described with regard to FIG. 5. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
carrying out computerized interactive feature visualization on a data set, wherein a plurality of insight classes rank a plurality of features of said data set;
via a computerized user interface, presenting the ranked plurality of features to a user;
via said computerized user interface, obtaining user feedback based on said interactive feature visualization, including a user selection of a subset of said features;
via said computerized user interface, obtaining a user scored ranking of features within said subset of said features;
applying at least one transformation function to at least one feature of said subset of features selected by said user, responsive to said user scored ranking of features, to automatically construct, with a computer, at least one additional new feature for said data set, said data set with said at least one additional new feature comprising a transformed data set;
iteratively repeating said steps of carrying out interactive feature visualization, obtaining user feedback, and applying said at least one transformation function, on said transformed data set, until a final data set is obtained;
carrying out at least one supervised task on said final data set, wherein said at least one supervised task comprises electricity demand prediction, further comprising at least one of:
causing additional electrical generation capacity to be activated, based on said prediction indicating increased demand; and
causing current electrical generation capacity to be reduced, based on said prediction indicating decreased demand.

2. The method of claim 1, wherein said applying of said at least one transformation function comprises applying a univariate data transformation function with said selected features as arguments.

3. The method of claim 1, wherein said applying of said at least one transformation function comprises applying a multivariate data transformation function with said selected features as arguments.

4. The method of claim 1, wherein said applying of said at least one transformation function comprises applying a multivariate data transformation function to arguments comprising at least one of said selected features and at least one existing one of said features.

5. The method of claim 1, further comprising carrying out at least one supervised task on said final data set, wherein accuracy of a machine learning system implementing said at least one supervised task is enhanced by said at least one additional feature.

6. The method of claim 1, further comprising carrying out at least one unsupervised task on said final data set.

7. The method of claim 1, further comprising carrying out data imputation on said final data set.

8. The method of claim 1, wherein, in said applying of said at least one transformation function, said at least one transformation function comprises a user-defined function in a database query language.

9. The method of claim 1, wherein said at least one transformation function is selected by a feature construction algorithm which matches functions to features based on the types, wherein said feature selection algorithm incorporates inherited type inferences.

10. The method of claim 1, wherein said at least one transformation function is selected by a feature construction algorithm which matches functions to features based on the types, wherein said feature selection algorithm incorporates keyword matching.

11. The method of claim 1, further comprising recommending a preliminary subset of said features for user selection.

12. A non-transitory computer readable medium comprising computer executable instructions which when executed by a computer cause the computer to perform a method of:
carrying out computerized interactive feature visualization on a data set, wherein a plurality of insight classes rank a plurality of features of said data set;
via a computerized user interface, presenting the ranked plurality of features to a user;
via said computerized user interface, obtaining user feedback based on said interactive feature visualization, including a user selection of a subset of said features;
via said computerized user interface, obtaining a user scored ranking of features within said subset of said features;
applying at least one transformation function to at least one feature of said subset of features selected by said user, responsive to said user scored ranking of features, to automatically construct, with said computer, at least one additional feature for said data set, said data set with said at least one additional feature comprising a transformed data set, wherein said at least one transformation function is selected by a feature construction algorithm which matches functions to features based on the semantic types of the features:
iteratively repeating said steps of carrying out interactive feature visualization, obtaining user feedback, and applying at least one transformation function, on said transformed data set, until a final data set is obtained;
carrying out at least one supervised task on said final data set, said at least one supervised task comprising demand prediction for a physical system; and
at least one of:
causing additional physical capacity of said physical system to be activated, based on said prediction indicating increased demand, by sending a first signal over a network interface; and causing current physical capacity of said physical system to be reduced, based on said prediction indicating decreased demand, by sending a second signal over said network interface.

13. An apparatus comprising:

a memory;

at least one processor, coupled to said memory, and operative to:

carry out computerized interactive feature visualization on a data set, wherein a plurality of insight classes rank a plurality of features of said data set;

implement a computerized user interface, which presents the ranked plurality of features to a user, and obtains user feedback that includes a user selection of a subset of said features and a user scored ranking of features within said subset of said features, based on said interactive feature visualization;

apply at least one transformation function to at least one feature of said subset of features selected by said user, responsive to said user scored ranking of features, to automatically construct at least one additional feature for said data set, said data set with said at least one additional feature comprising a transformed data set, wherein said at least one transformation function is selected by a feature construction algorithm which matches functions to features based on the types of the features; and iteratively repeat said carrying out interactive feature visualization, obtaining user feedback, and applying at least one transformation function, on said transformed data set, until a final data set is obtained; and a network interface coupled to said memory and said at least one processor, wherein said at least one processor is further operative to:

carry out at least one supervised task on said final data set, said at least one supervised task comprising demand prediction for a physical system; and at least one of:

cause additional physical capacity of said physical system to be activated, based on said prediction indicating increased demand, by sending a first signal over said network interface; and cause current physical capacity of said physical system to be reduced, based on said prediction indicating decreased demand, by sending a second signal over said network interface.

14. The apparatus of claim 13, wherein the processor is further operative to recommend a preliminary subset of said features for user selection.

\* \* \* \* \*